(12) United States Patent
Al Majid et al.

(10) Patent No.: US 11,991,250 B2
(45) Date of Patent: May 21, 2024

(54) SOCIAL NETWORK POOLED POST CAPTURE

(71) Applicant: Snap Inc., Santa Monica, CA (US)

(72) Inventors: Newar Husam Al Majid, New York, NY (US); Nathan Kenneth Boyd, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/205,381

(22) Filed: Jun. 2, 2023

(65) Prior Publication Data

US 2023/0308515 A1 Sep. 28, 2023

Related U.S. Application Data

(63) Continuation of application No. 17/534,021, filed on Nov. 23, 2021, now Pat. No. 11,736,572, which is a continuation of application No. 15/929,413, filed on Apr. 30, 2020, now Pat. No. 11,196,816.

(60) Provisional application No. 62/840,971, filed on Apr. 30, 2019.

(51) Int. Cl.
| | |
|---|---|
| *H04L 67/141* | (2022.01) |
| *G06F 3/0482* | (2013.01) |
| *G06F 3/04847* | (2022.01) |
| *H04L 51/10* | (2022.01) |
| *H04L 51/52* | (2022.01) |
| *H04L 67/143* | (2022.01) |

(52) U.S. Cl.
CPC .......... *H04L 67/141* (2013.01); *G06F 3/0482* (2013.01); *G06F 3/04847* (2013.01); *H04L 51/10* (2013.01); *H04L 51/52* (2022.05); *H04L 67/143* (2013.01)

(58) Field of Classification Search
CPC ....... H04L 67/141; H04L 51/10; H04L 51/52; H04L 67/143; H04L 67/04; H04L 67/568; G06F 3/0482; G06F 3/04847; H04W 4/21
See application file for complete search history.

(56) References Cited

U.S. PATENT DOCUMENTS

| | | | | |
|---|---|---|---|---|
| 9,681,265 | B1 * | 6/2017 | Davis | G06F 16/29 |
| 9,881,094 | B2 * | 1/2018 | Pavlovskaia | G06F 40/10 |
| 11,196,816 | B2 | 12/2021 | Al Majid et al. | |
| 2016/0283106 | A1 * | 9/2016 | Thorne | H04N 23/66 |
| 2017/0310888 | A1 * | 10/2017 | Wright | H04N 23/62 |
| 2017/0366697 | A1 * | 12/2017 | Shih | G06T 7/0002 |
| 2020/0351353 | A1 | 11/2020 | Al Majid et al. | |
| 2022/0086235 | A1 | 3/2022 | Al Majid et al. | |

OTHER PUBLICATIONS

"U.S. Appl. No. 15/929,413, 312 Amendment filed Nov. 1, 2021", 7 pgs.

(Continued)

*Primary Examiner* — Austin J Moreau
(74) *Attorney, Agent, or Firm* — Schwegman Lundberg & Woessner, P.A.

(57) ABSTRACT

A social network image pool system can capture one or more image data items (e.g., image, video) in a temporary persistent post pool. The post pool enables for efficient capture of multiple image data items for publishing in a manner that allows multiple images data items to be captured while preserving the editability of the multiple items before they are published to a social network site.

19 Claims, 15 Drawing Sheets

(56) References Cited

OTHER PUBLICATIONS

"U.S. Appl. No. 15/929,413, Notice of Allowance dated Jul. 30, 2021", 14 pgs.
"U.S. Appl. No. 15/929,413, PTO Response to Rule 312 Communication dated Nov. 8, 2021", 2 pgs.
"U.S. Appl. No. 17/534,021, Examiner Interview Summary dated Mar. 10, 2023", 2 pgs.
"U.S. Appl. No. 17/534,021, Examiner Interview Summary dated Mar. 16, 2023", 1 pg.
"U.S. Appl. No. 17/534,021, Notice of Allowance dated Mar. 16, 2023", 11 pgs.
"U.S. Appl. No. 17/534,021, Response filed Apr. 17, 23 to Examiner Interview Summary dated Mar. 10, 2023", 1 pg.
U.S. Appl. No. 15/929,413, 11/196,816, filed Apr. 30, 2020, Social Network Pooled Post Capture.
U.S. Appl. No. 17/534,021, filed Nov. 23, 2021, Social Network Pooled Post Capture.

\* cited by examiner

SOCIAL NETWORK POOLED POST CAPTURE

CLAIM OF PRIORITY

This application is a continuation of U.S. patent application Ser. No. 17/534,021, filed on Nov. 23, 2021, which is a continuation of U.S. patent application Ser. No. 15/929,413, filed on Apr. 30, 2020, which claims the benefit of priority to U.S. Provisional Application Ser. No. 62/840,971, filed on Apr. 30, 2019, each of which are incorporated herein by reference in their entireties.

TECHNICAL FIELD

The present disclosure generally relates to special-purpose machines that manage image content processing and improvements to such variants, and to the technologies by which such special-purpose machines become improved compared to other special-purpose machines for generating image content.

BACKGROUND

Users can capture and edit image content, such as images or videos, on user devices, such as mobile devices, smartphones, etc. While user devices enable electronic transmission of images, editing the images can be difficult through the limited resources of a mobile device. Furthermore, editing multiple images or videos and publishing them on a network (e.g., on a network site) is difficult due to these limitations.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Many users consume image content such as videos and images on their mobile devices (e.g., client devices). While some mobile devices enable electronic and transmission of images, editing an image or editing multiple images at a time can be difficult through the limited resources of a mobile device. Often times, users have to switch between multiple applications running on the mobile device to complete the actions of capturing, editing, reviewing and sending the image content to a social network site, or alternatively, saving the image content in a local memory of the mobile device. Furthermore, users often encounter the problem of losing a captured image content when accidentally sign off from the application or when the application is terminated by the mobile device.

The systems and method disclose herein improve on messaging systems by having a social network post pooling system that can allow users to capture multiple image data items in one session, and edit each of the items from a post pool one item at a time or in combination as a batch. The social network post pooling system can also allow users to publish the selected items as ephemeral messages on a social network site, and save the selected items to a local memory of the client device. In the event the post pool session is prematurely terminated by the client device, the social network post pooling system can allow users to continue editing and reviewing the captured multiple image data items after the premature termination. The social network post pooling system can further enable efficient capture of multiple image data items for publishing. Specifically, the social network post pooling system allows multiple images data items to be captured while preserving the editability of the multiple items before the multiple items are published to a social network site.

Figure 1:
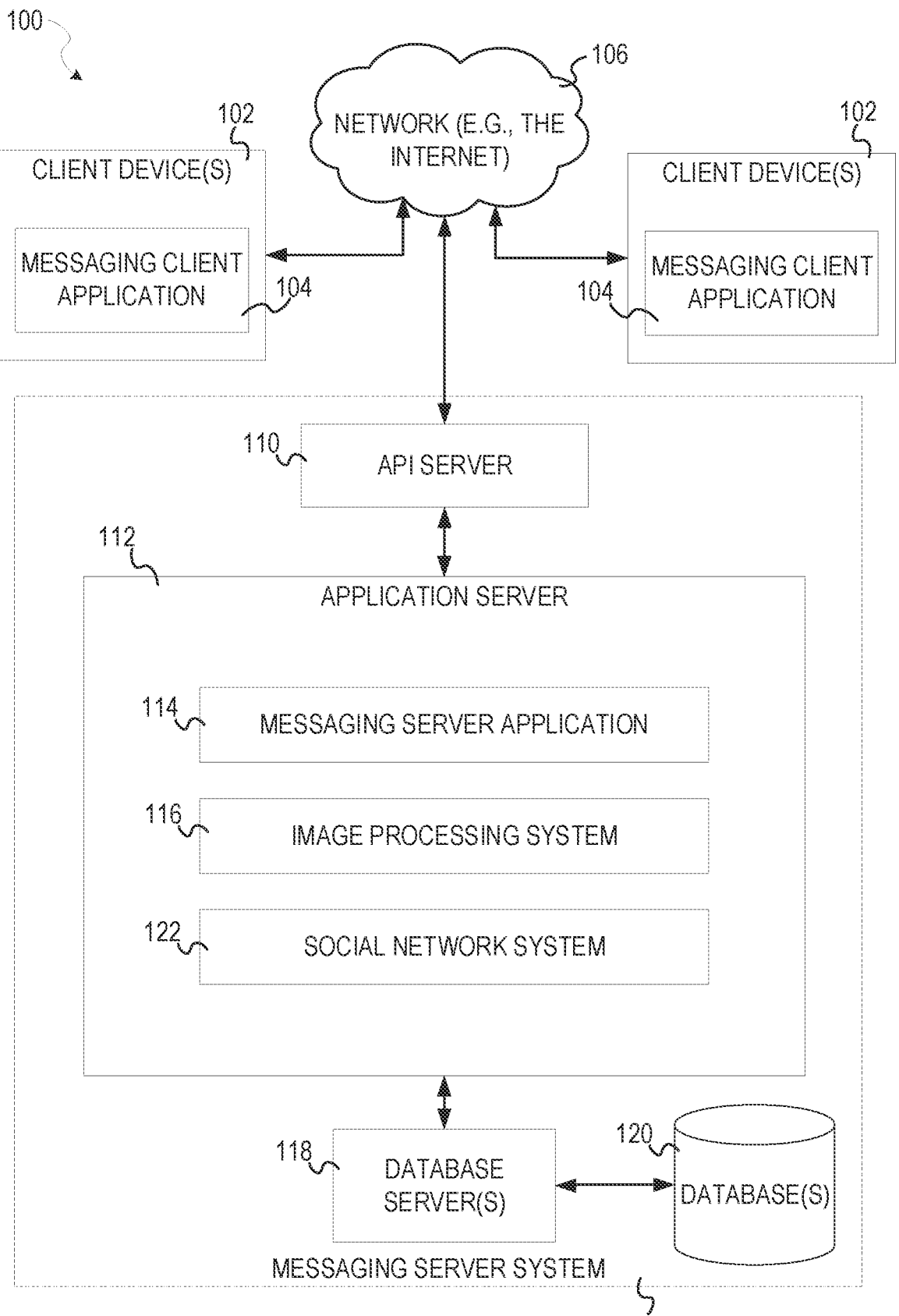
FIG. 1 is a block diagram showing an example messaging system for exchanging data (e.g., messages and associated content) over a network, according to example embodiments.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, and a social network system 122. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user. The application server 112 is communicatively coupled to a database server 118, which facilitates access to a database 120 in which is stored data associated with messages processed by the messaging server application 114.

Figure 2:
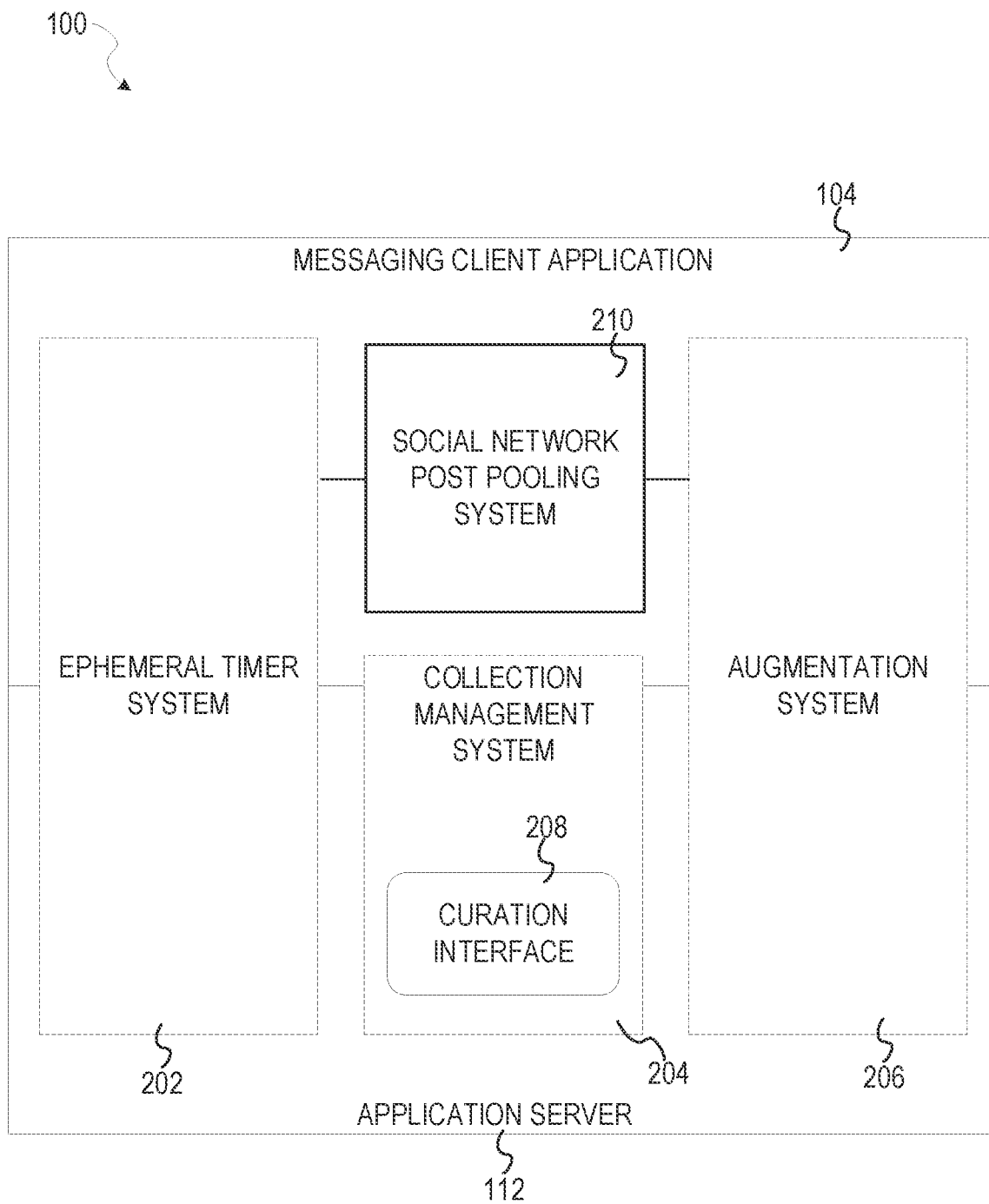
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an augmentation system 206, and a social network post pooling system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the augmentation system 206 provides a user-based publication platform that enables users to select a geolocation on a map and upload content associated with the selected geolocation. The user may also specify circumstances under which particular content should be offered to other users. The augmentation system 206 generates a media overlay that includes the uploaded content and associates the uploaded content with the selected geolocation.

In another example embodiment, the augmentation system 206 provides a merchant-based publication platform that enables merchants to select a particular media overlay associated with a geolocation via a bidding process. For example, the augmentation system 206 associates the media overlay of a highest-bidding merchant with a corresponding geolocation for a predefined amount of time.

As shown in FIG. 2, the messaging client application 104 and the application server 112 can also embody the social network post-pooling system 210 that is communicatively coupled to the augmentation system 206 and the ephemeral timer 202. The social network post-pooling system 210 enables the capture and editing of of multiple image data items in one session. The social network post pooling system can also provide for publishing of the selected items as ephemeral messages on a social network site and saving the selected items to a local memory of the client device. In the event the post pool session is prematurely terminated by the client device, the social network post pooling system enables resuming the editing and reviewing the captured multiple image data items after the premature termination. The social network post pooling system can further enable efficient capture of multiple image data items for publishing.

Figure 3:
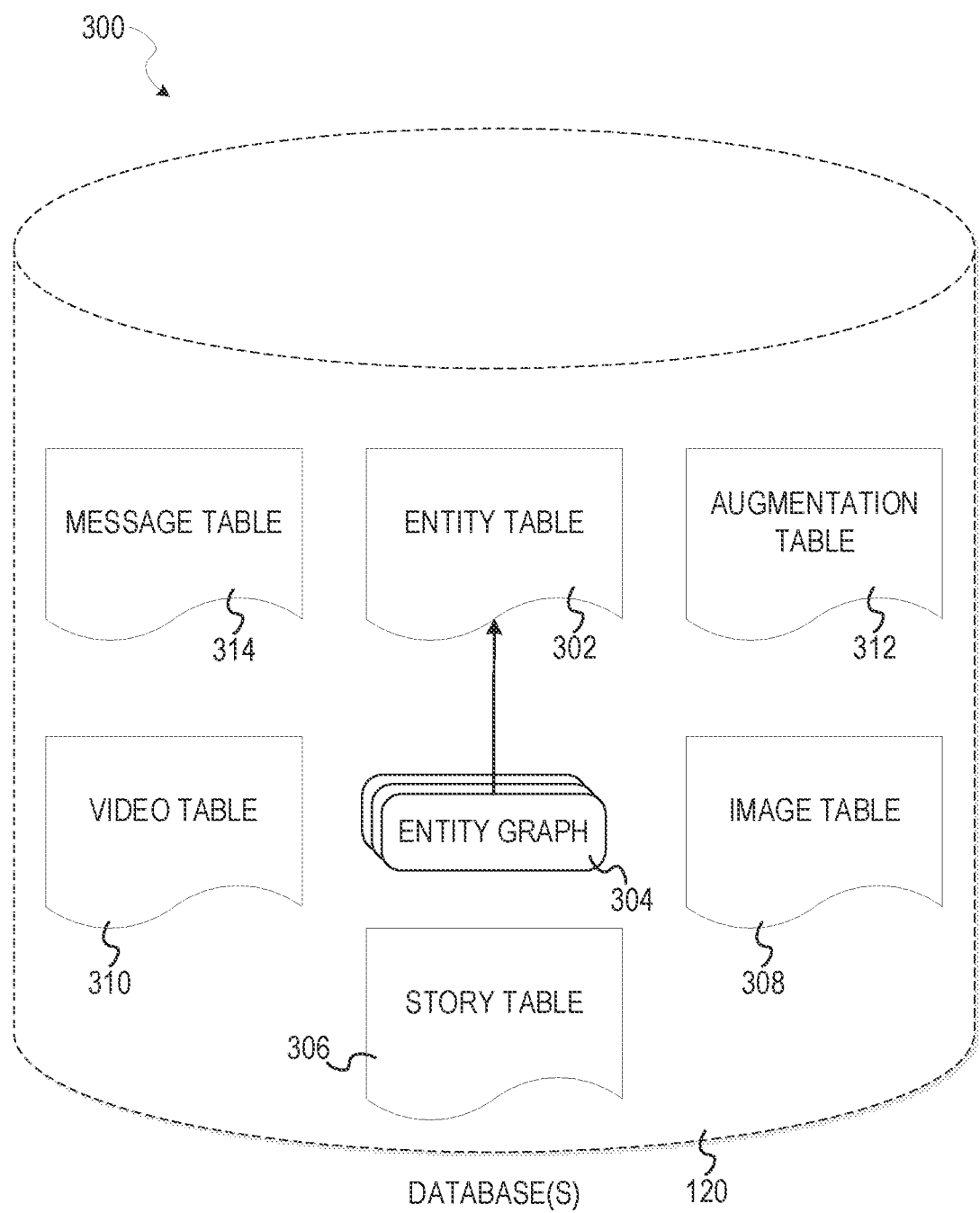
FIG. 3 is a schematic diagram illustrating data structure that may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores augmentation data, in the example form of filters, in an augmentation table 312. Filters for which data is stored within the augmentation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other augmentation data that may be stored within the image table 308 includes augmented reality content items (e.g., corresponding to applying Lenses or augmented reality experiences). An augmented reality content item may be a real-time special effect and sound that may be added to image content, such as an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various augmentations from the augmentation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
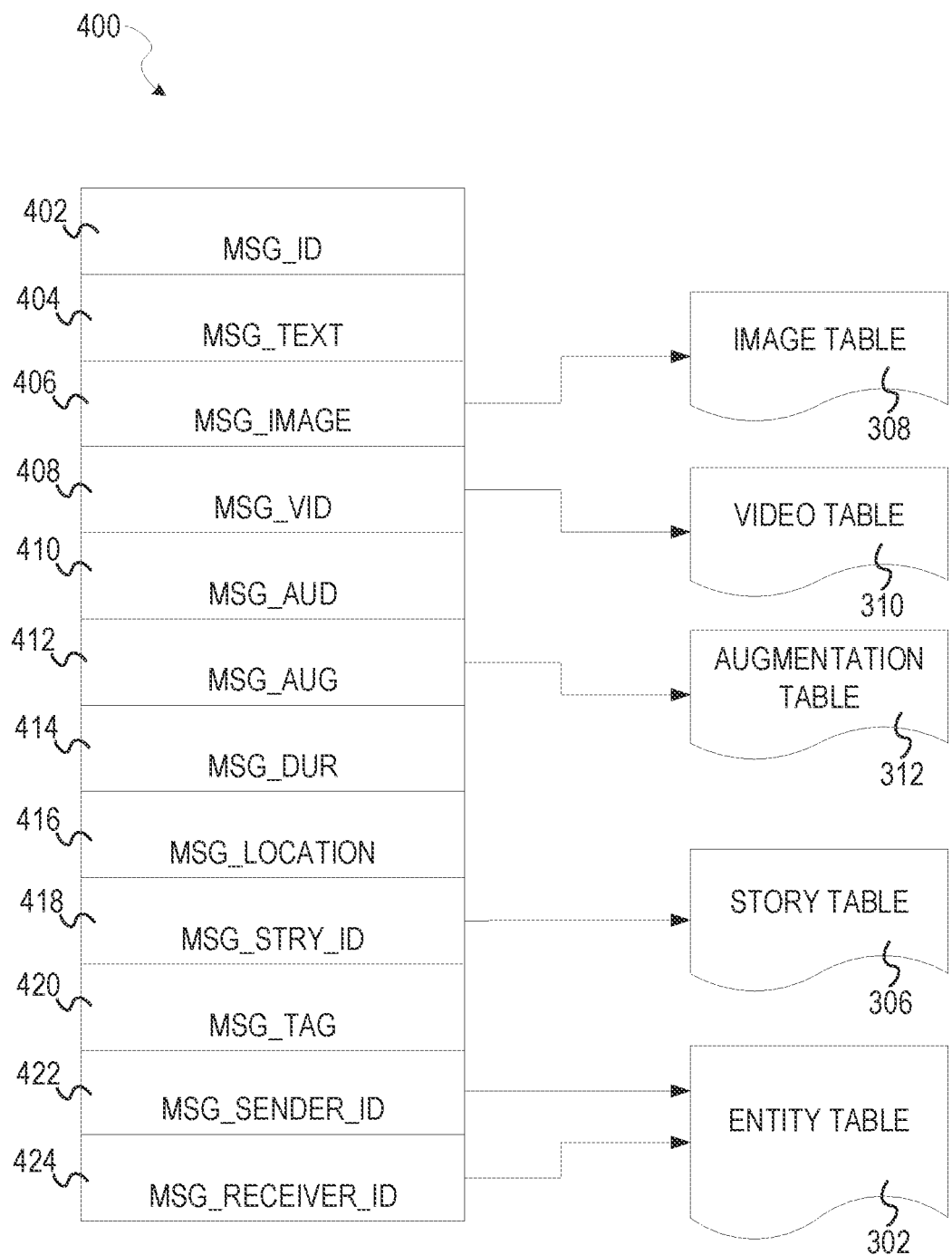
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message augmentation data 412: augmentation data (e.g., filters, stickers, or other annotations or enhancements) that represents augmentations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message augmentation data 412 may point to data stored in the augmentation table 312, values stored within the message story identifier 418 may point to data stored in the story table 306, and values stored within the message sender identifier 422 and the message receiver identifier 424 may point to user records stored within the entity table 302.

Figure 5:
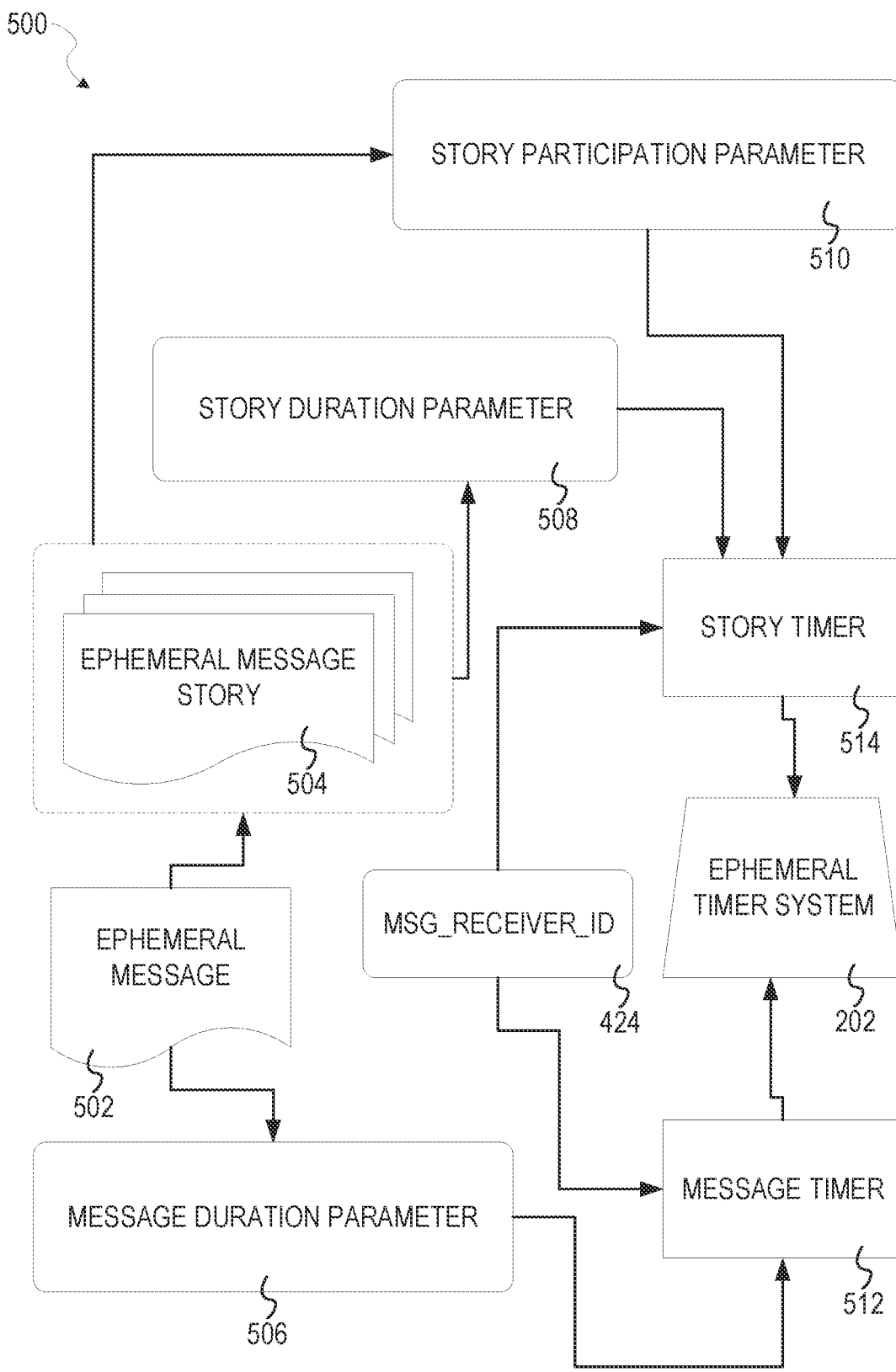
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
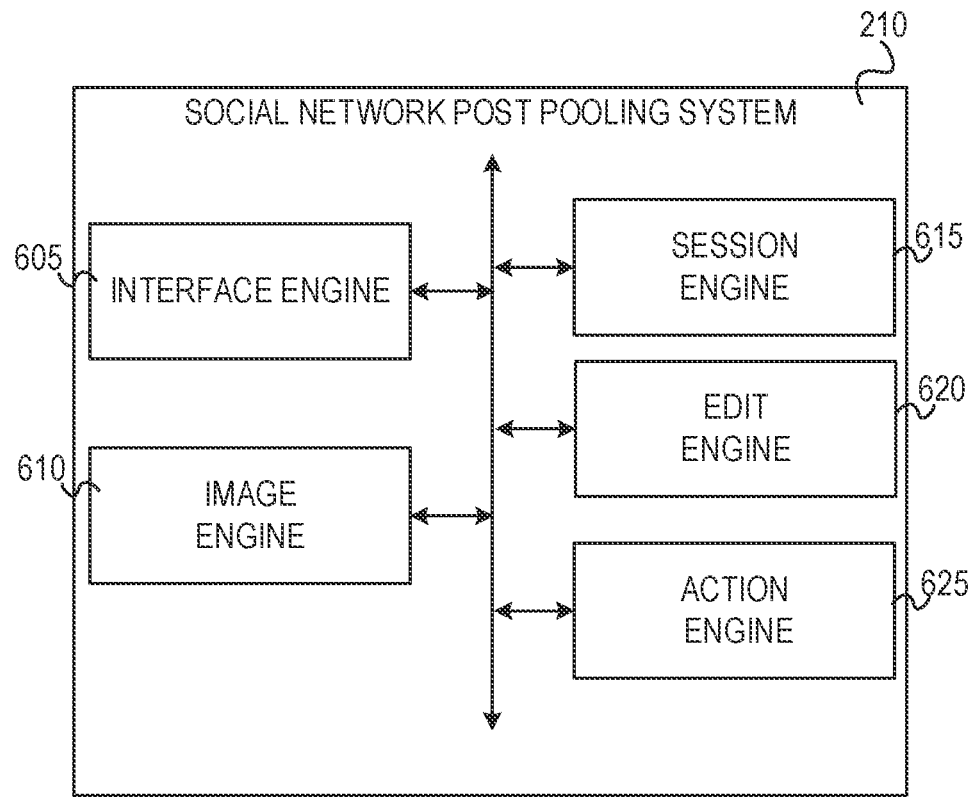
FIG. 6 shows example functional engines of a social network post pooling system, according to some example embodiments.

FIG. 6 shows example functional engines of a social network post pooling system 210, according to some example embodiments. As illustrated, the social network post pooling system 210 comprises an interface engine 605, an image engine 610, a session engine 615, an edit engine 620, and an action engine 625, according to some example embodiments.

The interface engine 605 manages generating interfaces and receiving instructions from the user of the device. The image engine 610 manages capturing image content, which can include image data items, such as images, image sequences (slide shows), or videos. The session engine 615 manages a persistent session for storage of a finite number of image data items. The edit engine 620 manages editing one or more image data items that are in an active pool session using imaging processing. Examples of image processing includes receiving and applying to the image data items augmentation data such as media overlays, augmented reality content items, overlays, image transformations, AR images, etc. The action engine 625 manages performing actions with content in the active session pool. For example, the action engine 625 can perform actions such as storing the image data items on memory of a client device, deleting one or more of the items, transmitting the items for publishing as an ephemeral message on a social network site, etc.

Figure 7:
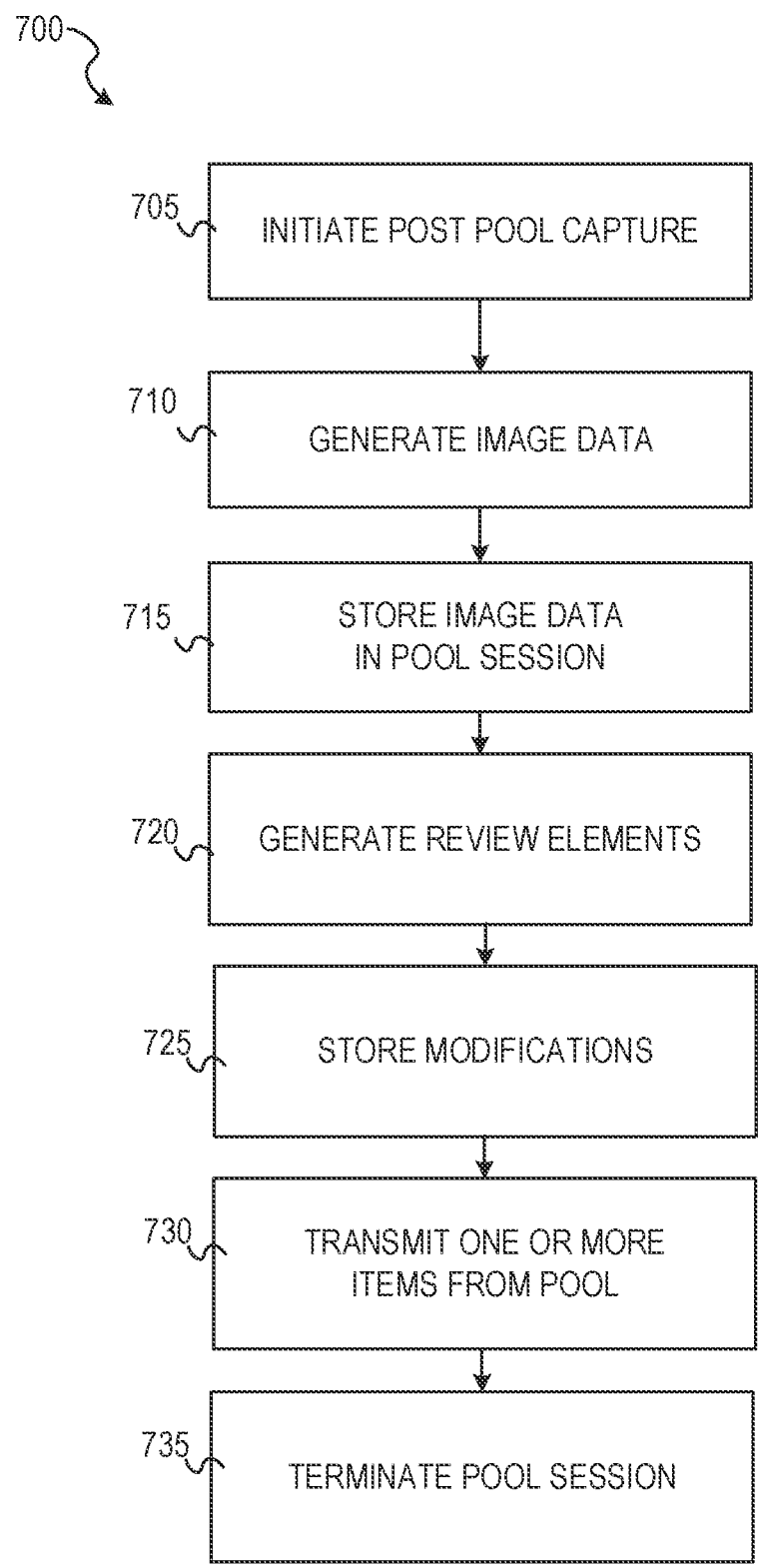
FIG. 7 shows a flow diagram of an example method for capturing image content using the system, according to some example embodiments.

FIG. 7 shows a flow diagram of an example method 700 for capturing image content using the social network post pooling system 210, according to some example embodiments. At operation 705, a post pool capture session is initiated. For example, the interface engine 605 receives selection of a pool user interface element (e.g., UI button) on the display device of the client device, and responsive to the received selection, the session engine 615 initiates an active social network pool session on the user device. The pool user interface element includes the batch button 1003.

At operation 710, the image engine 610 generates image content, including image data items, such as images, image sequences (slide shows), or videos that are stored in temporary memory allocated for the active pool session. For example, the user of the client device selects a batch capture button that if tapped, the image engine 610 generates an image for storage in the active pool session, whereas if the batch capture button is pressed and held, a video recording is generated for the duration of the button depression. In one embodiment, the image engine 610 generates the image stored in a temporary memory allocated for the active social network pool session without immediately displaying the multiple image data items on the client device. The image engine 610 allows users to continuously capture (e.g. generate) multiple image data items (e.g. images and videos) up to a pool limit. During the capture, the interface engine 605 does not immediately display the captured multiple image data items on the user interface of the client device, which allows the user to continuously capturing more items up to a pool limit.

At operation 715, the session engine 615 stores the image data items in the active social network pool session that are generated by the image engine 610. During the capture, the session engine 615 stores the captured items in a temporary memory allocated for the active social network pool session.

At operation 720, the edit engine 620 generates review elements (e.g., edit buttons) displayed on the user interface of the user device as discussed below with reference to FIGS. 10, 12 and 13. The edit engine 620 may receives edits and modifications to each of the multiple image data items in the active social network pool session based on the user selection and interaction with each of the review elements.

At operation 725, the action engine 625 stores the modifications associated with each edited image data item per the received edits and modifications. For example, the action engine 625 moves the edited items stored in temporary memory for the active session to a main image gallery of the client device 102 operating system or a main gallery area of the application 104 for later viewing and edits through the application 104.

At operation 730, the action engine 625 transmits one or more selected multiple image data items as ephemeral messages on a social network site. For example, the action engine 625 publishes the one or more selected multiple image data items as ephemeral messages on a social network site. The action engine 625 may also save the one or more image data items from the pool in the main gallery memory of the application 104 or the local memory of the client device 102.

At operation 735, in response to the operation by the action engine 625 (e.g., transmitting the pool items, closing the pool, or saving the items), the session engine 615 terminates the active social network pool session and the user device, or allows the application 104 stays in the batch capture mode without returning to the single image content capture and share mode. In some examples, the user device or application 104 returns to the single image content capture and share mode after the session engine 615 terminates the active social network pool session. In some examples, the action engine 625 deletes the image data items from the temporary memory allocated for the active social network pool session after the user publishes the multiple data items as ephemeral messages on a social network site or saves the multiple data items in the local memory of the client device 102.

Figure 8:
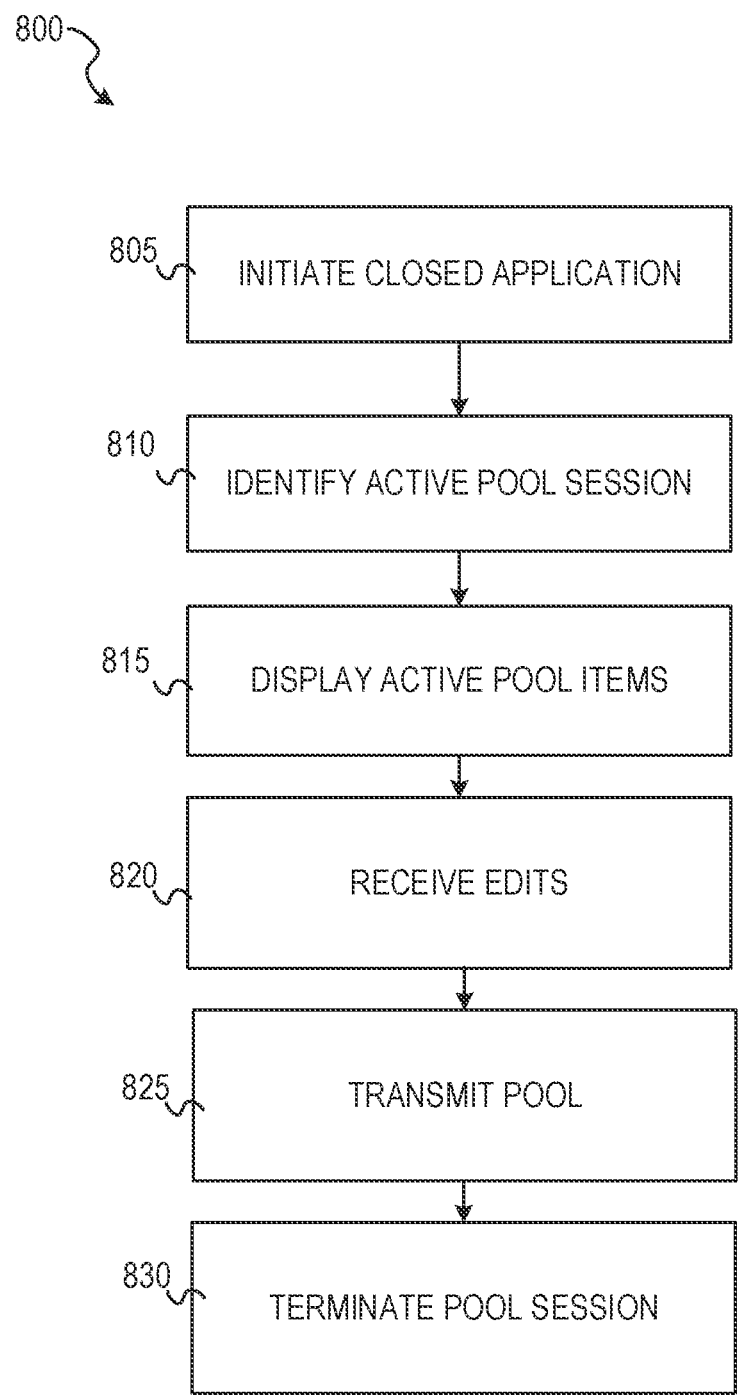
FIG. 8 shows an example flow diagram of an example method for managing pool sessions, according to some example embodiments.

FIG. 8 shows an example flow diagram of an example method 800 for managing pool sessions, according to some example embodiments. At operation 805, the client device 102 initiates the application 104, which was previously intentionally or prematurely terminated. For example, prior to method 800 being performed, the user of the client device may have started a post pool session, captured a few image data items in the pool, and accidentally closed the application 104, thereby closing the integrated social network post pooling system 210. In this example, at operation 805, the user opens the application 104 at operation 805 that he/she accidentally closed.

At operation 810, in response to the application 104 being activated, the social network post pooling system 210 activates and the session engine 615 identifies that an active pool session exists in persistent state memory of application 104. For example, the session engine 615 identifies the pool that was previously initiated and comprises the image data items captured before the application was accidentally closed). The session engine 615 identifies that the active social network pool session is prematurely terminated by a client device event that is not a pre-configured user termination event. The pre-configured user termination event may include, referring to FIG. 12, saving (e.g. storing) the image data items in a local memory of a client device via tapping the save button 1215, or publishing the image data items on a social network site via tapping the share button 1220. A client device event may a user selection of any interface element (e.g., UI button) on the display device of the client device generated by the social network post pooling system 210.

At operation 815, the session engine 615 reactivates the pool session and displays the pool image data items on the display screen of the client device. At operation 820, the edit engine 620 receives edits to one or more items in the pool via review elements (e.g., edit buttons) displayed on the display device of the user device. At operation 825, the action engine 625 transmits the one or more items in the pool. For example, the action engine 625 publishes the pool items as an ephemeral message on the social network site. At operation 830, the session engine 615 terminates the active session pool thereby removing the items from the persistent memory of the pool, and the user device or application 104 stays in the batch capture mode without returning to the single image content capture mode.

Figure 9:
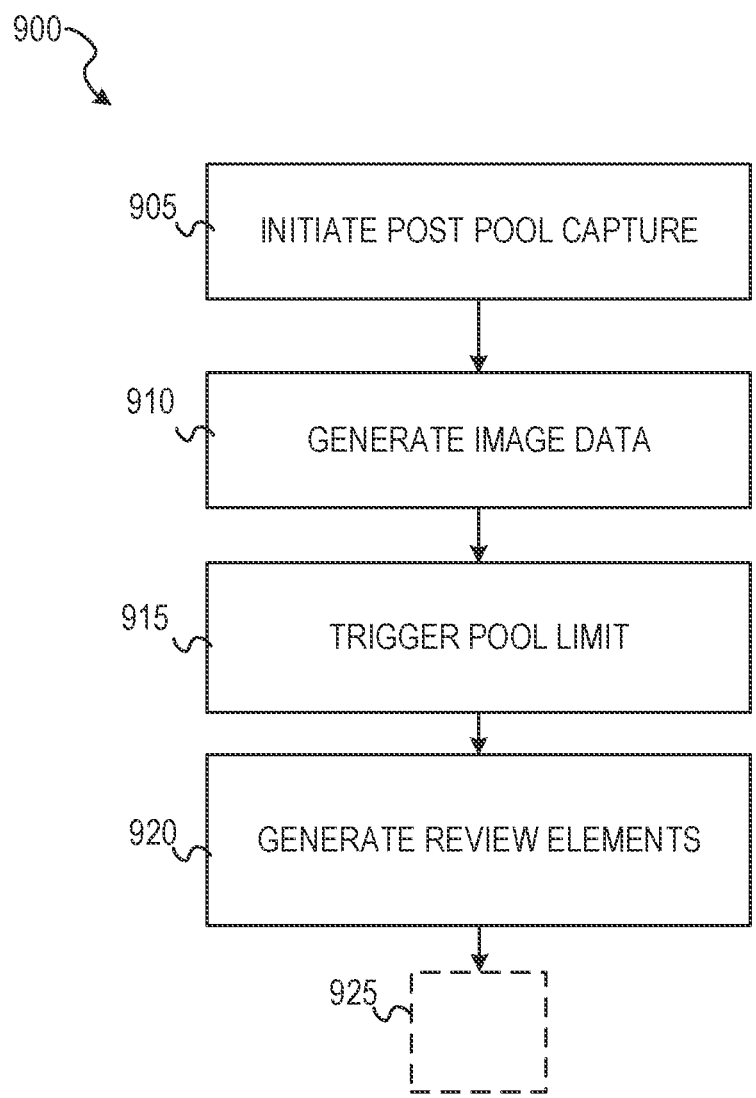
FIG. 9 shows a flow diagram of a method for constraining a pool session, according to some example embodiments.

FIG. 9 shows a flow diagram of a method 900 for constraining a pool session, according to some example embodiments. At operation 905, the session engine 615 initiates a pool session. At operation 910, the image engine 610 generates a plurality of image data items (e.g., images, video); as the image data items are created, they are added to the active session pool, according to some example embodiments. At operation 915, the session engine 615 determines that a quantity of the multiple image data items in the active social network pool session meets a pool limit. The pool limit may include a threshold number of image data items taken at a single active social network pool session, memory storage limit of image data items individually or combined (e.g. pool memory limit), a time duration threshold of each image data items displays individually or combined (e.g. pool time limit). For example, the pool time limit may also be a time duration threshold associated with all of the multiple image data items automatically playing one after another from the multi-item navigation element 1205 as a complete preview of what will be posted upon selecting the share button 1220.

At operation 920, in response to the pool limit being met, the edit engine 620 automatically initiates the edit user interface, and the user can edit or delete items from the pool in an edit mode via the edit user interface. In one embodiment, in response to the session engine 615 identifying the pool limit being met, the session engine 516 causes the client device to display an edit user interface configured to receive and apply edits from a user to the multiple image data items using image processing.

After operation 920, the method 900 may continue to other operations at operation 925, such as pool item transmission, deletion, and so on, as discussed above. For example, operation 925 may be operation 725 or operation 820.

Figure 10:
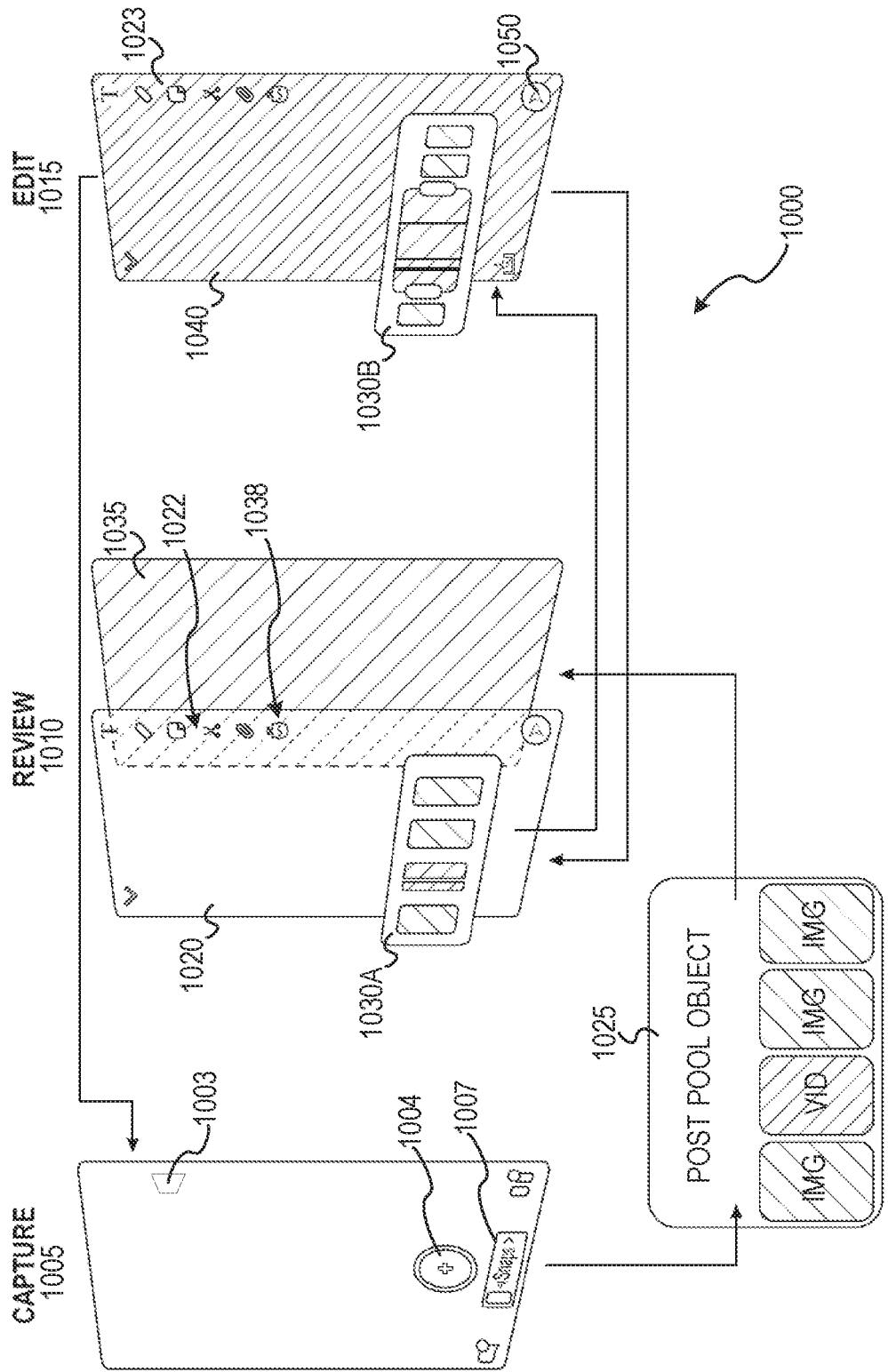
FIG. 10 shows an example application architecture for a system, according to some example embodiments.

FIG. 10 shows an example application architecture 1000 for the social network post pooling system 210, according to some example embodiments. In response to the user selecting batch button 1003, the social network post pooling system 210 initiates an active pool object 1025 (that corresponds to a persistent memory session), and a batch capture button 1004 is displayed on the user interface indicating the system 210 is in batch capture mode 1005, in which the user can tap or hold down the batch capture button 1004 to create images and video that are automatically added to active pool object 1025. The user can select the review button 1007 when the user no longer wants to add items to the pool (or in response to the pool limit being triggered as discussed). In response to the selection of review button 1007, the system 210 enters a review mode 1010, in which the multi-item navigator element 1030A shows thumbnails of the items in the active pool object 1025. In some example embodiments a media player 1035 plays content selected in the multi-navigator element to let the user preview what was captured. According to some example embodiments, an invisible edit layer 1020 is overlaid on the player 1035 to display selectable edit buttons 1022 that can be selected by the user to initiate an edit mode 1015. Users may also initiate the edit mode 1015 by tapping on any of the thumbnails, tapping on the background displaying the image data item, or swiping on the background displaying the image data item to apply a media overlay, etc. For example, if the user selects the second item in the pool, a video, the system 210 enters edit mode 1015 in which the edit engine can modify the items in the pool. In the illustrated example embodiments, the multi-item navigator element 1030B is augmented with edit controls, such as a video control that allows the user to trim the length of the video or split the video into two video items in the pool. Additionally, the user can use edit buttons 1023 to apply editing effects to individual items in the pool or in bulk. The editing effects may include audio and visual content and visual effects. Examples of audio and visual content include pictures, texts, logos, animations, and sound effects. An example of a visual effect includes color overlaying. For example, the user can select the text edit button "T" in edit buttons (e.g., edit buttons 1023), then select all of the items in the multi-item navigator element 1030B, then type text on the image idem being displayed in the preview edit screen 1040, and the typed text is added as a text overlay on all the items in the pool. The user can also select the post duration timer button 1038 (the stopwatch icon) included in the edit buttons 1023 to customize how long each image data item in the pool displays as part of an ephemeral message sequence or story. According to some examples, the post duration may range from 1 second to 10 seconds.

After the user is satisfied with the items in the pool, the user can select share button 1050 to publish the items as an ephemeral message or a series of ephemeral messages on a social network site, as discussed above.

In some example embodiments, the review mode 1010 is omitted, and in response to selecting the review button 1007, the system 210 proceeds directly from batch capture mode 1005 to a hybrid review and edit mode that performs the functions of review mode 1010 and edit mode 1015.

Figure 11:
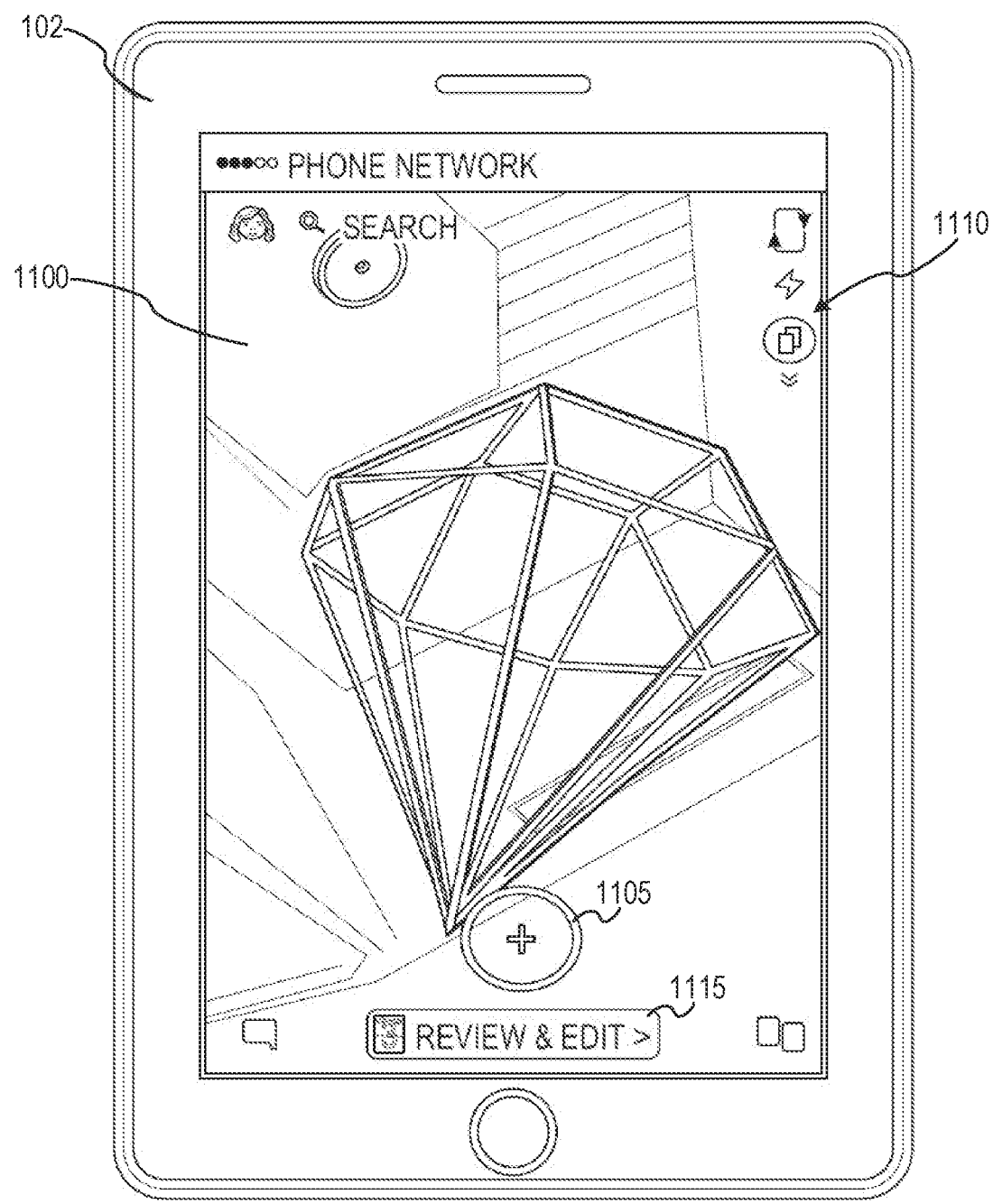
FIG. 11 shows a client device in batch capture mode, according to some example embodiments.

FIG. 11 shows a client device 102 in batch capture mode, according to some example embodiments. In the example illustrated, the user has selected the batch mode button 1110, which changes the image capture button to the batch image capture button 1105 (which is denoted in the latter by adding a "+" to the capture button element). The user can then tap or hold down button 1105, which automatically adds the image data items to the pool, but does not show them in the user interface 1100. When the user is finished batch capturing, the user selects review button 1115 to review, select, remove, or edit the pool items, as discussed in further detail below with reference to FIG. 12 and FIG. 13.

Figure 12:
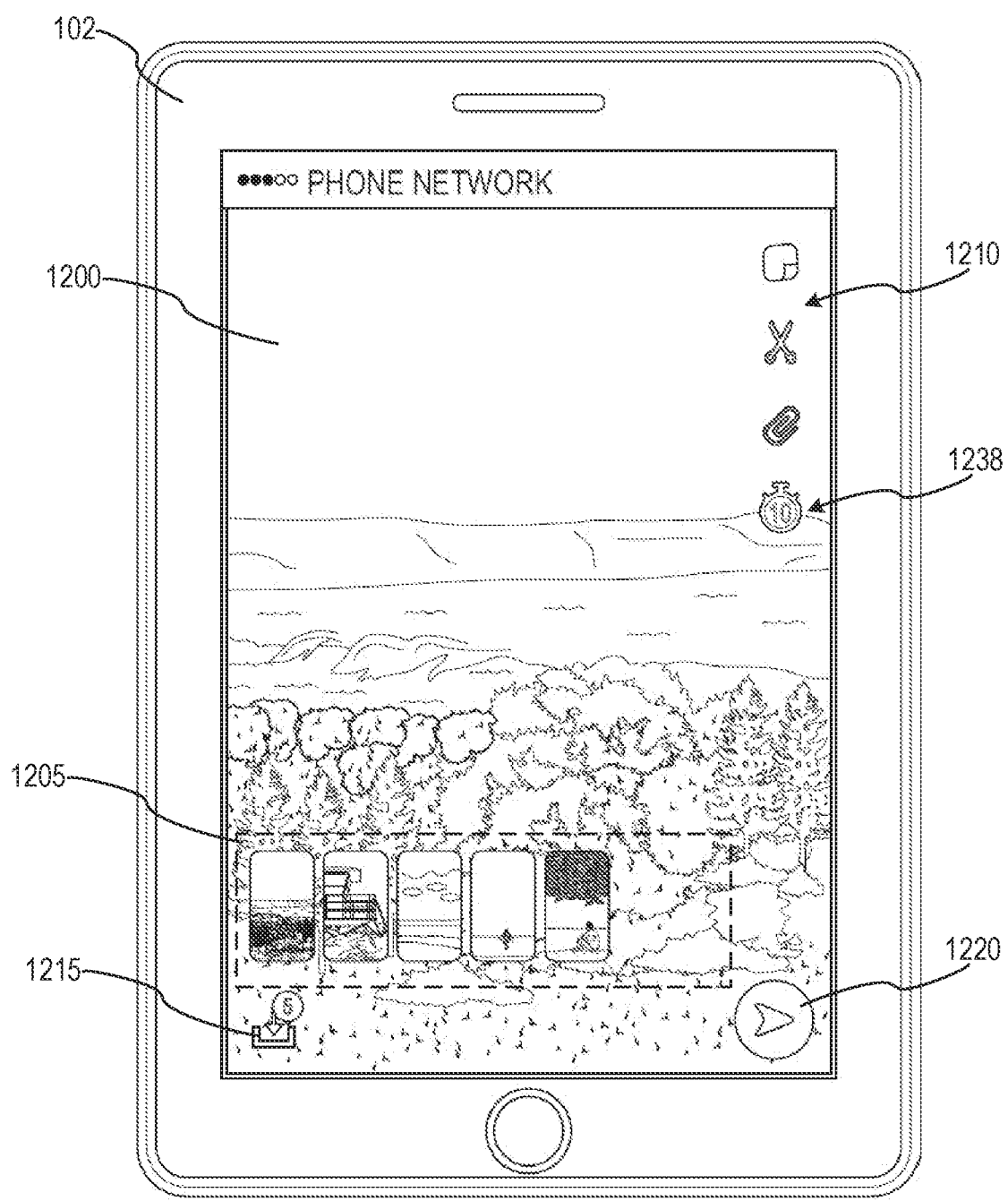
FIG. 12 shows an example review user interface, according to some example embodiments.

FIG. 12 shows an example review user interface 1200 of system 210, according to some example embodiments. In the example of FIG. 12, the multi-item navigation element 1205 displays the pool items as thumbnails. The user can select one of the items and the item will be previewed (displayed if an image or played if a video) in the background player which is visible in the review user interface 1200. The user can further select share button 1220 to immediately publish the pool items on a network site, or save button 1215 to save the one or more image data items from the pool in the main gallery memory of the application 104 or the local memory of the client device 102. In some example embodiments, a pre-configured user termination event such as saving (e.g. storing) the image data items or publishing the image data items on a social network site may operate to terminate the pool session and the image data items will be deleted from the pool session; whereas closing the application 104 will keep the session alive and save the items for later edits. If the user selects the edit buttons 1210, the application enters the edit mode, as discussed with reference to FIGS. 10, 12, and 13. Further, in some example embodiments, the review user interface 1200 functions as an automatic timed preview of the image data items in the pool, where each item has a preconfigured preview time limit. For instance, in the review interface 1200, the first from the left item in the multi-item navigation element 1205 is displayed in full size on the review user interface 1200 for five seconds, followed by automatically playing the second item from the multi-item navigation element 1205 in full size for five seconds, and so forth so that the review interface 1200 functions a complete preview of what will be posted upon selecting the share button 1220. The preconfigured preview time limit for each item in the pool may be the same duration, or in some instances, may be different durations depending on the types of the items. In some example embodiments, the user can select an item in the multi-item navigation element 1205 and change the time it is displayed via tapping on the post duration timer button 1238. For example, the user can select five seconds for the first item, but 1 second for the second item, and 10 seconds for the third item, thereby allowing the user to preview and customize the flow how each item will place upon being accessed and viewed by other users once they're published on the social network site via the share button 1220.

Figure 13:
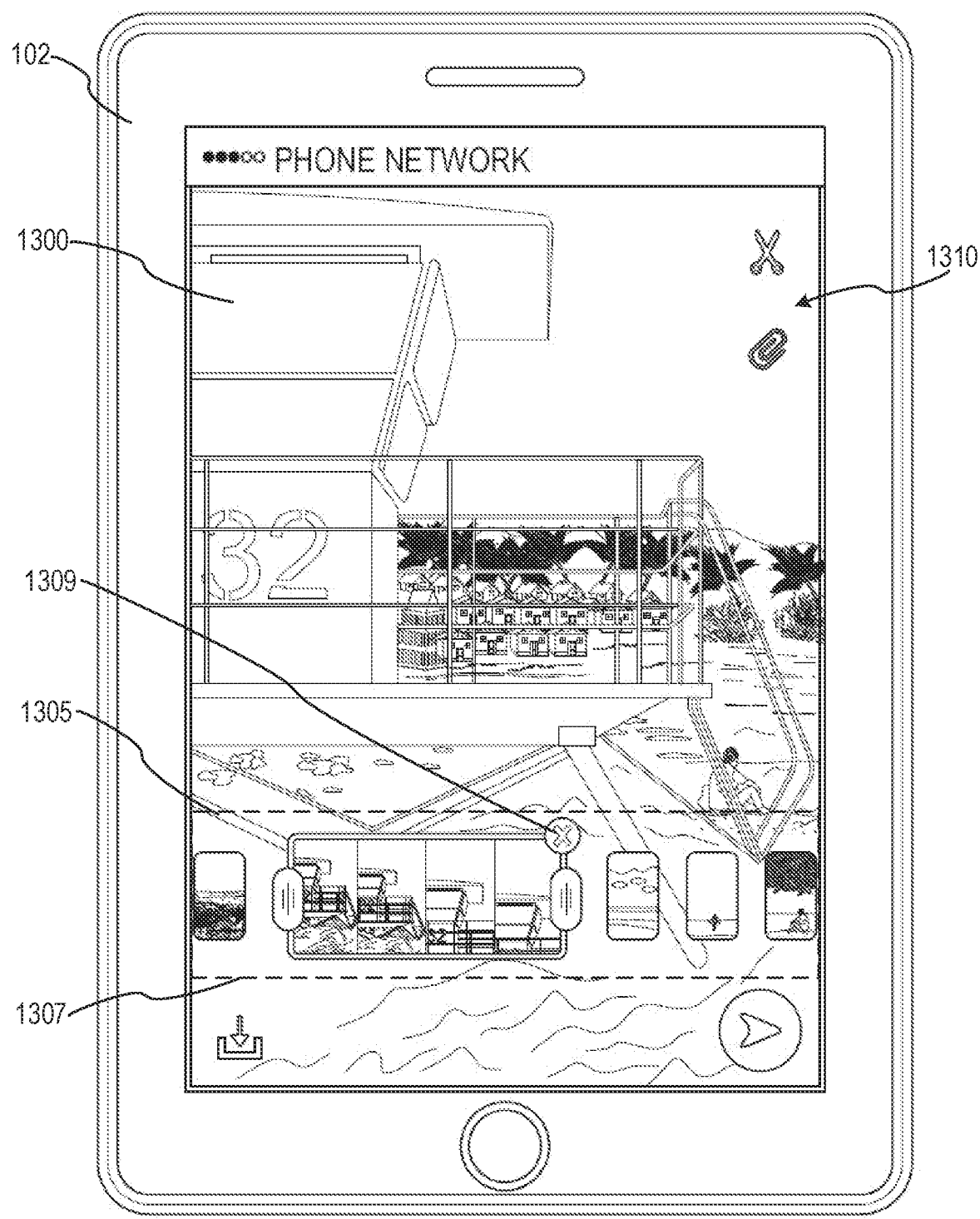
FIG. 13 shows an example edit user interface, according to some example embodiments.

FIG. 13 shows an example edit user interface 1300 of the social network post pooling system 210, according to some example embodiments. In the edit user interface 1300, the user can select an item, such as video item 1305. The edit user interface is configured to perform different edits depending on which type of item is selected. For example, in response to selecting video item 1305, the multi-item navigation element 1307 expanse the thumbnail view of the video item 1305 to allow the user to trim the length. Further, the user can select the remove element 1309 to remove the video item 1305 from the pool. Additionally, the user can use edit buttons 1310 to apply edits to individual image data items or all of the items in the pool as discussed above. Like in the review mode of FIG. 12, the user can then terminate the pool by saving the pool times using button 1313 or publishing the items as an ephemeral message or series of ephemeral messages. In some example embodiments, which edit buttons are displayed depends on what type of item is being selected. In the example of FIG. 13, a video is being edited, to the edit buttons correspond to video edit buttons 1310. Whereas with reference to FIG. 12, if an image is selected different edit buttons 1210 are displayed, that can be used to perform image edits. For example, image edits include imaging processing, such as media overlay or augmentation with reference to FIG. 2. Additionally, if the user selects the post duration timer button (the stopwatch icon), the user can customize how long each image data item (e.g. an image or a video) in the pool displays as a part of an ephemeral message sequence or story; in this way, the user can more completely control how the items in the pool are viewed by other users when the items are published via the share button 1220.

Figure 14:
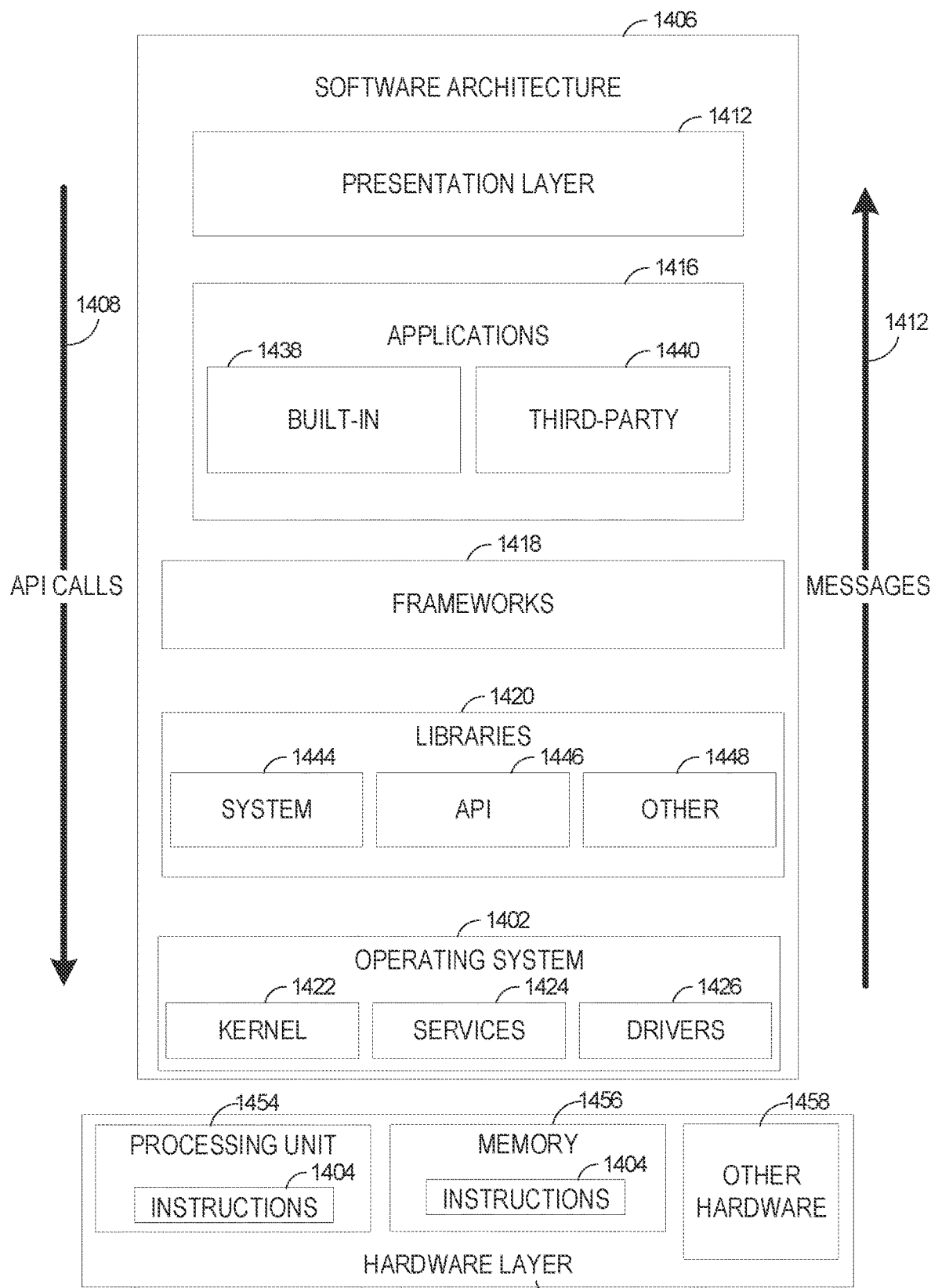
FIG. 14 is a block diagram illustrating a representative software architecture, which may be used in conjunction with various hardware architectures herein described.

FIG. 14 is a block diagram illustrating an example software architecture 1406, which may be used in conjunction with various hardware architectures herein described. FIG. 14 is a non-limiting example of a software architecture, and it will be appreciated that many other architectures may be implemented to facilitate the functionality described herein. The software architecture 1406 may execute on hardware such as a machine 1500 of FIG. 15 that includes, among other things, processors, memory, and I/O components. A representative hardware layer 1452 is illustrated and can represent, for example, the machine 1500 of FIG. 15. The representative hardware layer 1452 includes a processing unit 1454 having associated executable instructions 1404. The executable instructions 1404 represent the executable instructions of the software architecture 1406, including implementation of the methods, components, and so forth described herein. The hardware layer 1452 also includes a memory/storage 1456, which also has the executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1418, applications 1516, and a presentation layer 1414. Operationally, the applications 1516 and/or other components within the layers may invoke API calls 1408 through the software stack and receive a response in the form of messages 1412. The layers illustrated are representative in nature and not all software architectures have all layers. For example, some mobile or special-purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1516 and/or other components and/or layers. The libraries 1420 provide functionality that allows other software components to perform tasks in an easier fashion than by interfacing directly with the underlying operating system 1402 functionality (e.g., kernel 1422, services 1424, and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1516 and other software components/modules.

The frameworks/middleware 1418 provide a higher-level common infrastructure that may be used by the applications 1516 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1516 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. The third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as the operating system 1402) to facilitate functionality described herein.

The applications 1516 may use built-in operating system functions (e.g., kernel 1422, services 1424, and/or drivers 1426), libraries 1420, and frameworks/middleware 1418 to create user interfaces to interact with users of the system. Alternatively, or additionally, in some systems, interactions with a user may occur through a presentation layer, such as the presentation layer 1414. In these systems, the application/component "logic" can be separated from the aspects of the application/component that interact with a user.

Figure 15:
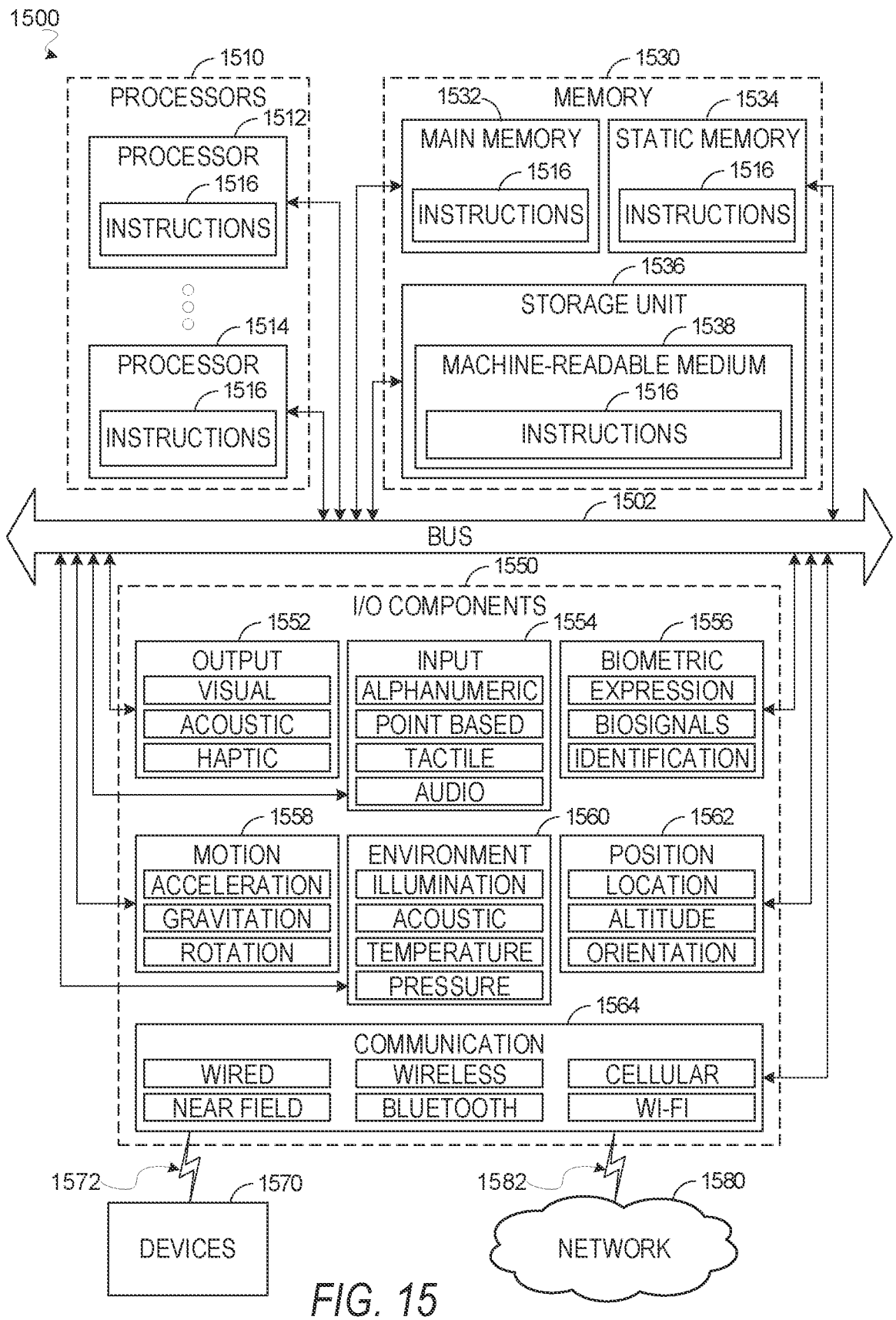
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. As such, the instructions may be used to implement modules or components described herein. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. The memory/storage 1530 may include a main memory 1532, static memory 1534, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1436 (e.g., on machine readable-medium 1538), within at least one of the processors 1510 (e.g., within the processor cache memory accessible to processors 1512 or 1514), or any suitable combination thereof, during execution thereof by the machine 1500. Accordingly, the memory 1532, the storage unit 1536, and the memory of the processors 1510 are examples of machine-readable media.

The I/O components 1550 may include a wide variety of components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environment components 1560, or position components 1562 among a wide array of other components. For example, the biometric components 1556 may include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environment components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or other suitable device to interface with the network 1580. In further examples, the communication components 1564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1516 for execution by the machine 1500, and includes digital or analog communications signals or other intangible media to facilitate communication of such instructions 1516. Instructions 1516 may be transmitted or received over the network 1580 using a transmission medium via a network interface device and using any one of a number of well-known transfer protocols.

"CLIENT DEVICE" in this context refers to any machine 1500 that interfaces to a network 1580 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1580.

Glossary

"COMMUNICATIONS NETWORK" in this context refers to one or more portions of a network 1580 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1516 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions 1516 (e.g., code) for execution by a machine 1500, such that the instructions 1516, when executed by one or more processors 1510 of the machine 1500, cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1512 or a group of processors 1510) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine 1500) uniquely tailored to perform the configured functions and are no longer general-purpose processors 1510.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1512 configured by software to become a special-purpose processor, the general-purpose processor 1512 may be configured as respectively different special-purpose processors (e.g., comprising different hardware components) at different times. Software accordingly configures a particular processor 1512 or processors 1510, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1510 that are temporarily configured (e.g., by software) or permanently configured to perform the relevant operations. Whether temporarily or permanently configured, such processors 1510 may constitute processor-implemented components that operate to perform one or more operations or functions described herein. As used herein, "processor-implemented component" refers to a hardware component implemented using one or more processors 1510. Similarly, the methods described herein may be at least partially processor-implemented, with a particular processor 1512 or processors 1510 being an example of hardware. For example, at least some of the operations of a method may be performed by one or more processors 1510 or processor-implemented components. Moreover, the one or more processors 1510 may also operate to support performance of the relevant operations in a "cloud computing"

environment or as a "software as a service" (SaaS). For example, at least some of the operations may be performed by a group of computers (as examples of machines 1500 including processors 1510), with these operations being accessible via a network 1580 (e.g., the Internet) and via one or more appropriate interfaces (e.g., an API). The performance of certain of the operations may be distributed among the processors 1510, not only residing within a single machine 1500, but deployed across a number of machines 1500. In some example embodiments, the processors 1510 or processor-implemented components may be located in a single geographic location (e.g., within a home environment, an office environment, or a server farm). In other example embodiments, the processors 1510 or processor-implemented components may be distributed across a number of geographic locations.

"PROCESSOR" in this context refers to any circuit or virtual circuit (a physical circuit emulated by logic executing on an actual processor 1512) that manipulates data values according to control signals (e.g., "commands," "op codes," "machine code," etc.) and which produces corresponding output signals that are applied to operate a machine 1500. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1510 may further be a multi-core processor 1510 having two or more independent processors 1512, 1514 (sometimes referred to as "cores") that may execute instructions 1516 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   initiating a pool session based on a request from a device, the pool session being an active social network pool session that allows continuous generation of media data items up to a pool limit;
   generating one or more media data items during the pool session;
   detecting that a quantity of the one or more media data items in the pool session meets the pool limit; and
   in response to detecting that the quantity of the one or more media data items meets the pool limit:
      terminating the pool session, and
      causing display of the one or more media data items in a user interface of the device for editing the one or more media data items.

2. The method of claim 1, wherein the pool limit is a threshold number of media data items generated in a single pool session.

3. The method of claim 1, wherein the pool limit is a first pool limit, further comprising:
   detecting that a time duration of the one or more media data items being displayed individually or combined meets a second pool limit; and
   based on the detecting of the time duration, terminating the pool session before the quantity of the one or more media data items in the pool session meets the first pool limit.

4. The method of claim 3, wherein the second pool limit is a threshold time duration of display in a single pool session.

5. The method of claim 1, further comprising:
   detecting a user interaction with the user interface to publish the one or more media data items as one or more ephemeral messages on a social network site.

6. The method of claim 5, further comprising:
   based on the detecting of the user interaction, deleting the one or more media data items from a temporary memory allocated for the pool session.

7. The method of claim 1, further comprising:
   generating an invisible edit layer overlaid on a media player displaying the one or more media data items on the user interface, the invisible edit layer includes one or more selectable edit buttons corresponding to one or more editing effects.

8. The method of claim 7, further comprising:
   receiving a selection of an editing effect; and
   simultaneously applying the editing effect to the one or more media data items.

9. The method of claim 1, further comprising:
   generating a plurality of review elements in the user interface of the device;
   storing modifications associated with each edited media data item;
   detecting a selection of one or more edited media data items; and
   transmitting the one or more edited media data items as one or more ephemeral messages on a social network site.

10. A system comprising:
    one or more hardware processors; and
    a non-transitory machine-readable medium for storing instructions that, when executed by the one or more hardware processors, cause the one or more hardware processors to perform operations comprising:
    initiating a pool session based on a request from a device, the pool session being an active social network pool session that allows continuous generation of media data items up to a pool limit;
    generating one or more media data items during the pool session;
    detecting that a quantity of the one or more media data items in the pool session meets the pool limit; and
    in response to detecting that the quantity of the one or more media data items meets the pool limit:
       terminating the pool session, and
       causing display of the one or more media data items in a user interface of the device for editing the one or more media data items.

11. The system of claim 10, wherein the pool limit is a threshold number of media data items generated in a single pool session.

12. The system of claim 10, wherein the pool limit is a first pool limit, further comprising:
    detecting that a time duration of the one or more media data items being displayed individually or combined meets a second pool limit; and
    based on the detecting of the time duration, terminating the pool session before the quantity of the one or more media data items in the pool session meets the first pool limit.

13. The system of claim 12, wherein the second pool limit is a threshold time duration of display in a single pool session.

14. The system of claim 10, wherein the operations further comprise:

detecting a user interaction with the user interface to publish the one or more media data items as one or more ephemeral messages on a social network site.

15. The system of claim 14, wherein the operations further comprise:
based on the detecting of the user interaction, deleting the one or more media data items from a temporary memory allocated for the pool session.

16. The system of claim 10, wherein the operations further comprise:
generating an invisible edit layer overlaid on a media player displaying the one or more media data items on the user interface, the invisible edit layer includes one or more selectable edit buttons corresponding to one or more editing effects.

17. The system of claim 16, wherein the operations further comprise:
receiving a selection of an editing effect; and
simultaneously applying the editing effect to the one or more media data items.

18. The system of claim 10, wherein the operations further comprise:
generating a plurality of review elements in the user interface of the device;
storing modifications associated with each edited media data item;
detecting a selection of one or more edited media data items; and
transmitting the one or more edited media data items as one or more ephemeral messages on a social network site.

19. A non-transitory machine-readable medium for storing instructions that, when executed by one or more hardware processors, cause the one or more hardware processors to perform operations comprising:
initiating a pool session based on a request from a device, the pool session being an active social network pool session that allows continuous generation of media data items up to a pool limit;
generating one or more media data items during the pool session;
detecting that a quantity of the one or more media data items in the pool session meets the pool limit; and
in response to detecting that the quantity of the one or more media data items meets the pool limit:
terminating the pool session, and
causing display of the one or more media data items in a user interface of the device for editing the one or more media data items.

* * * * *